Dec. 3, 1957   D. O. DAVIES ET AL   2,814,928
FUEL SYSTEM FOR GAS-TURBINE ENGINE REHEAT COMBUSTION STAGE
Filed July 19, 1951   4 Sheets-Sheet 1

INVENTORS
D. O. DAVIES +
A. JUBB
By Wilkinson + Mawhinney
ATTYS.

Dec. 3, 1957  D. O. DAVIES ET AL  2,814,928
FUEL SYSTEM FOR GAS-TURBINE ENGINE REHEAT COMBUSTION STAGE
Filed July 19, 1951  4 Sheets-Sheet 2

INVENTORS
D. O. DAVIES +
A. JUBB
By Wilkinson + Mawhinney
ATTYS.

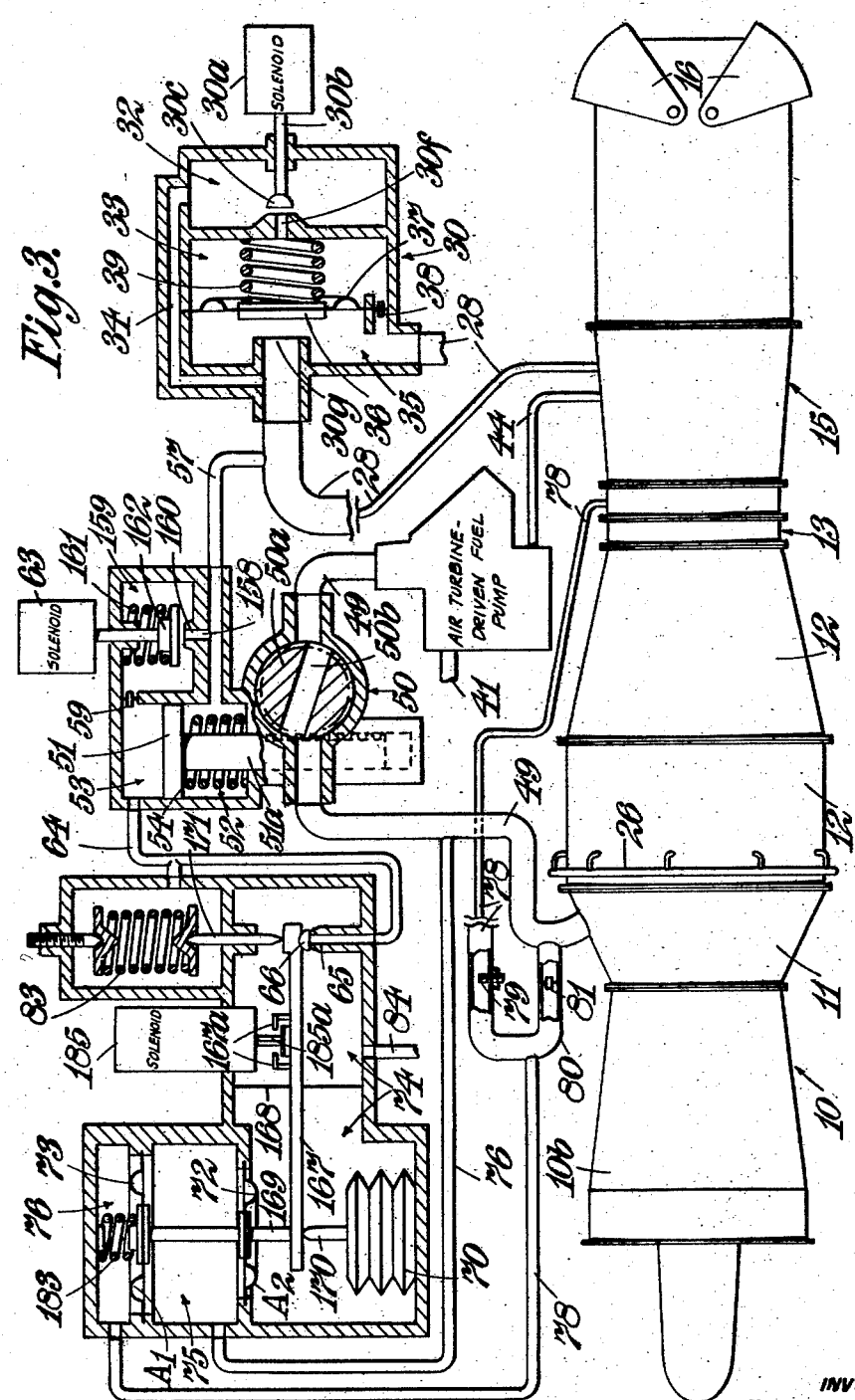

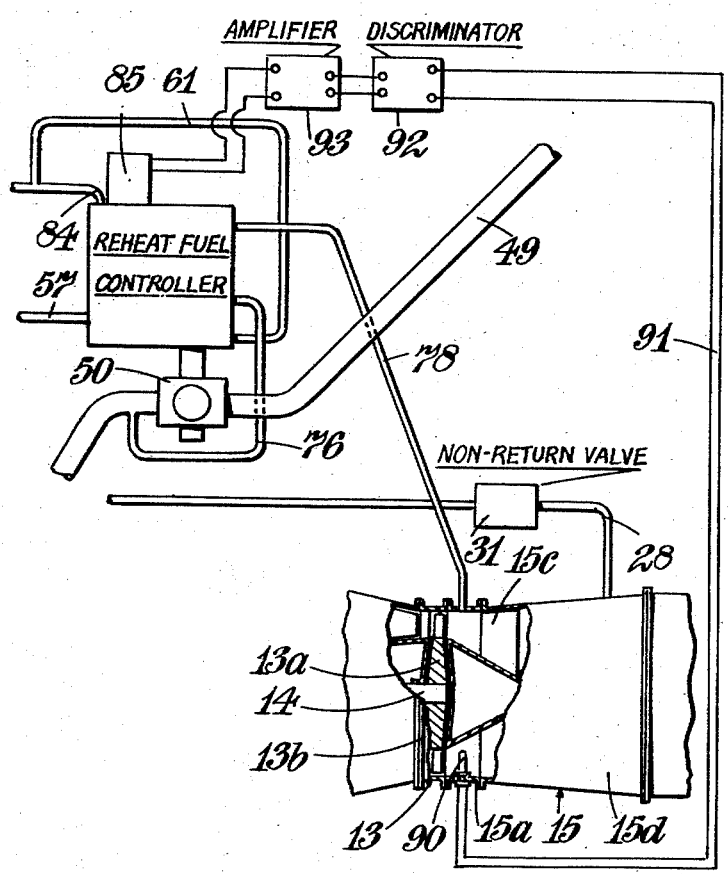

United States Patent Office 2,814,928
Patented Dec. 3, 1957

2,814,928

FUEL SYSTEM FOR GAS-TURBINE ENGINE REHEAT COMBUSTION STAGE

David Omri Davies, Ammanford, South Wales, and Albert Jubb, Buttershaw, Bradford, England, assignors to Rolls-Royce Limited, Derby, England, a British company Application July 19, 1951, Serial No. 237,628

Claims priority, application Great Britain July 20, 1950

18 Claims. (Cl. 60—35.6)

This invention relates to gas-turbine engine fuel systems. It is concerned particularly with fuel systems for engines of the kind having in addition to a main combustion stage, one or more additional combustion stages in which gases from the main combustion stage are reheated after passing through a turbine. Such an additional combustion stage is referred to hereafter as "a reheat combustion stage."

The primary object of the present invention is to provide means for controlling the fuel supply to a reheat combustion stage of a gas-turbine engine in a manner to maintain the ratio of the absolute pressure on the upstream side of the turbine to the absolute pressure on the downstream side thereof at a substantially constant preselected value.

According to the present invention, there is provided a fuel system for a gas-turbine engine having a compressor, main combustion equipment, a turbine, reheat combustion equipment and a propelling nozzle connected in flow series, which fuel system comprises a fuel pump arranged to deliver fuel to the reheat combustion equipment, an air turbine connected to drive said fuel pump, a source of compressed air, an air-supply controlling throttle connected to control the supply of compressed air from said source to said air-turbine thereby to control the rotational speed of the turbine, and a pressure-sensitive device arranged to be sensitive to a preselected value of the ratio of a pressure at a point in the engine between the compressor delivery and the turbine inlet to a pressure at a point in the engine between the turbine and the propelling nozzle and arranged, upon sensing such preselected value of the ratio, to operate to control the adjustment of said air-supply controlling throttle.

Preferably the air-supply-controlling throttle is arranged to be actuated by a pressure-fluid-operated servo mechanism, and the pressure-sensitive device is arranged to control a servo-fluid pressure in the servo mechanism. The servo mechanism may comprise a piston movable in a cylinder having a restricted fluid communication between its ends, having a pressure servo-fluid supply connected to one end and having an outflow valve connected to control a flow of servo-fluid from the other end of the cylinder which outflow valve is actuated by the pressure-sensitive device thereby to control the pressure drop across the piston.

An important application of the fuel systems of this invention is in a gas-turbine engine of the kind which is used for aircraft propulsion by jet reaction, in which the working fluid passes in succession through main combustion equipment wherein the working fluid is heated, a turbine and a reheat combustion stage wherein the working fluid is reheated prior to discharge through a propelling nozzle at high velocity to provide propulsive thrust, and in which the propelling nozzle is adjustable in exit area to have a larger effective area when the reheat combustion stage is operative than when it is inoperative. When this kind of gas-turbine engine is operating at its maximum rotational speed and with the propelling nozzle choked, the ratio of the absolute pressure just upstream of the turbine to that just downstream of the turbine is substantially constant and independent of the altitude at which the engine is being operated. By employing a fuel system according to this invention in a gas-turbine engine of this kind, the fuel supply to the reheat stage is controlled so that the ratio of the absolute pressures just upstream and downstream of the turbine is maintained at a substantially constant value when the reheat combustion stage is operating. The value at which the ratio is maintained when the reheat combustion stage is operating is preferably that which exists at the maximum rotational speed of the engine when the reheat combustion equipment is inoperative—this being possible since opening the propelling nozzle decreases the pressure just downstream of the turbine and burning fuel in the reheat stage increases this pressure—but the value may in certain cases be different from that existing when the reheat combustion stage is inoperative.

The fuel system according to this invention may also comprise a temperature-sensitive control means arranged to vary the fuel supply to the reheat combustion stage, and the temperature-sensitive means may be arranged for example to prevent a preselected temperature from being exceeded in the turbine. In another arrangement, the fuel supply to the reheat combustion stage is controlled by a basic adjustment of the air-supply controlling throttle by the pressure-sensitive device thereby to maintain a predetermined value of the pressure ratio and the temperature-sensitive control means is arranged to effect a trimming adjustment of said air-supply controlling throttle to maintain a preselected temperature in the turbine, it being operative not only to decrease the fuel flow but also to increase fuel flow appropriately to maintain the temperature at the preselected value; in such an arrangement the temperature-sensitive control means will operate as a "trimming" device on the basic control which is operative to maintain a substantially constant value of the pressure ratio.

Two fuel systems embodying a control in accordance with this invention will now be described with reference to the accompanying diagrammatic drawings, in which:

Figure 3 illustrates a second embodiment of part of the fuel system and control means, and Figure 4 is a view corresponding to the central portion of Figure 1, but showing a modification of the invention.

Figure 1:
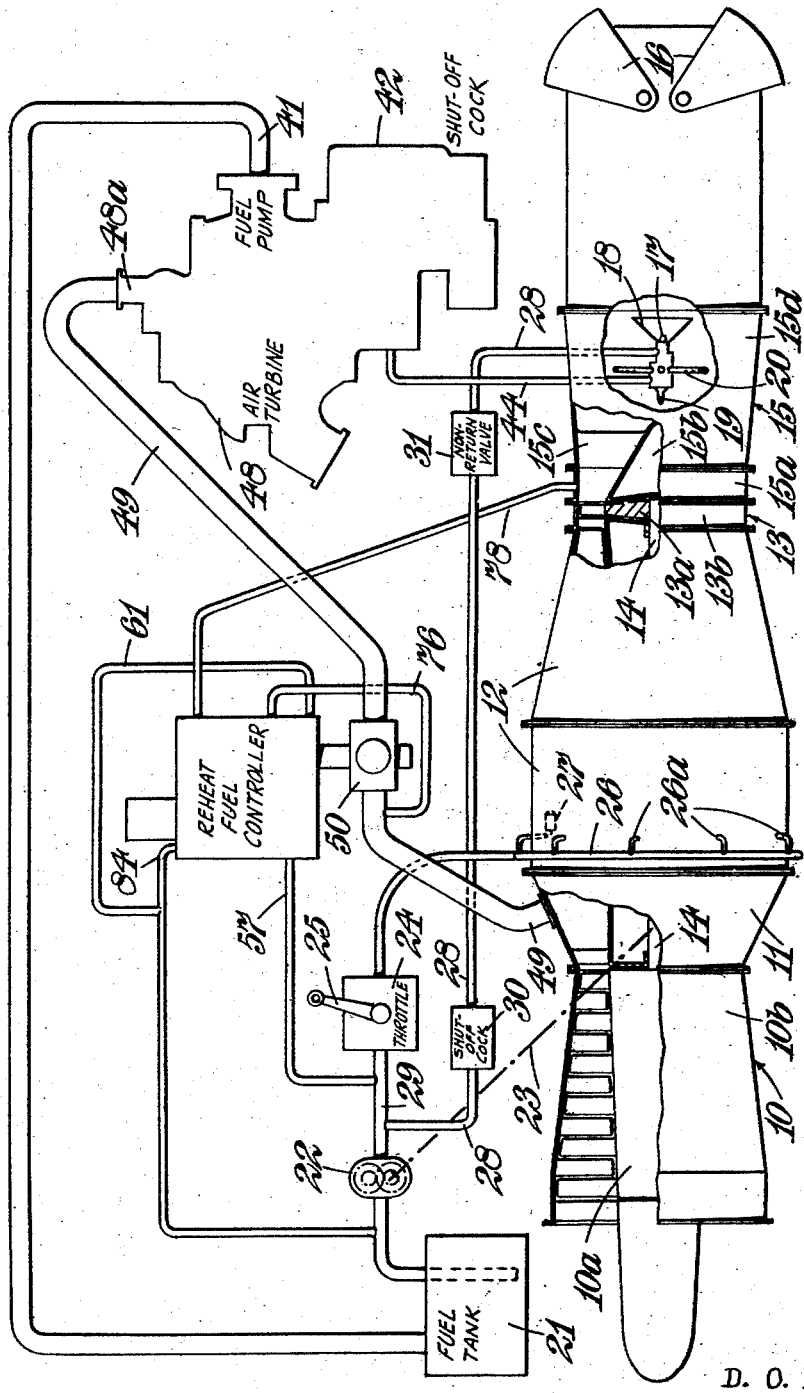
Figure 1 illustrates a gas-turbine engine and its fuel system.

Referring to Figure 1 there is illustrated a conventional form of gas-turbine engine such as is used for propelling an aircraft by jet reaction. The gas-turbine engine is illustrated as comprising a compressor 10 having a rotor 10a and a stator 10b, a compressed air delivery section 11 receiving the compressed air from the delivery end of the compressor 10, main combustion equipment 12 connected to the delivery section 11 to receive compressed air therefrom and in which fuel is burnt, a turbine 13 having a rotor 13a and a stator 13b connected to the downstream end of the combustion equipment to receive combustion products therefrom, said turbine rotor 13a being drivingly connected to the compressor rotor 10a by a shaft 14, and an exhaust assembly 15 receiving the exhaust gases from the turbine, which exhaust assembly comprises an outer casing 15a and immediately downstream of the turbine a conical fairing 15b coaxial with the outer casing 15a and supported therefrom by streamline struts 15c. The exhaust assembly 15 also comprises a jet pipe 15d having at its outlet end a propelling nozzle and in the arrangement illustrated the propelling nozzle is shown to be one whereof the effective area is capable of adjustment by nozzle segments 16.

The main combustion equipment 12 of the gas-turbine engine is in operation throughout the period of operation of the gas-turbine engine. With engines such as that shown it is sometimes desirable to burn extra fuel in the jet-pipe to increase the propulsive thrust developed by the engine and there is then provided in the jet-pipe 15d suitable reheat combustion equipment. One known form of such combustion equipment is illustrated in Figure 1 and this form comprises a first pilot fuel injector 17 arranged to inject fuel in a downstream direction and located a conical baffle 18, a second pilot fuel injector 19 and main fuel injectors indicated at 20, which second pilot fuel injector 19 and main fuel injectors 20 are arranged to inject fuel upstream from the fuel injection means. The reheat combustion equipment is arranged in a portion of the jet-pipe 15d having an increasing cross-sectional area so that a decrease in exhaust gas velocity occurs and an improved combustion efficiency obtained.

It is usual when operating the reheat combustion equipment for the nozzle segments 16 to be adjusted to increase the effective area of the outlet nozzle from the jet-pipe from the normal value of the area employed when the reheat combustion equipment is inoperative.

The engine fuel supply and control system is also indicated diagrammatically in Figure 1 and the fuel supply system for the main combustion equipment 12 is illustrated as comprising a fuel tank 21, a fuel pump 22 which is conveniently driven from the engine shaft 14 as by the drive indicated at 23, a fuel control arrangement 24 which may be of any known or convenient form and usually includes a throttle 25, a fuel manifold 26 from which a number of branches 26a lead to main fuel injection devices for the main combustion equipment 12, one of which fuel injection devices is indicated at 27.

The fuel supply for the reheat combustion equipment is, in this embodiment, obtained partly from the fuel system of the main combustion equipment and partly from a separate fuel system. The pilot fuel injector 17 is supplied from the fuel system of the main combustion equipment 12 by means of a pipeline 28 branching from a pipeline 29 interconnecting the fuel pump 22 and the fuel control arrangement 24, there being arranged in the pipeline 28 a shut-off cock 30 and a non-return valve 31.

The shut-off cock 30 is operated under control of the operator and may be electrically operated.

Figure 2:
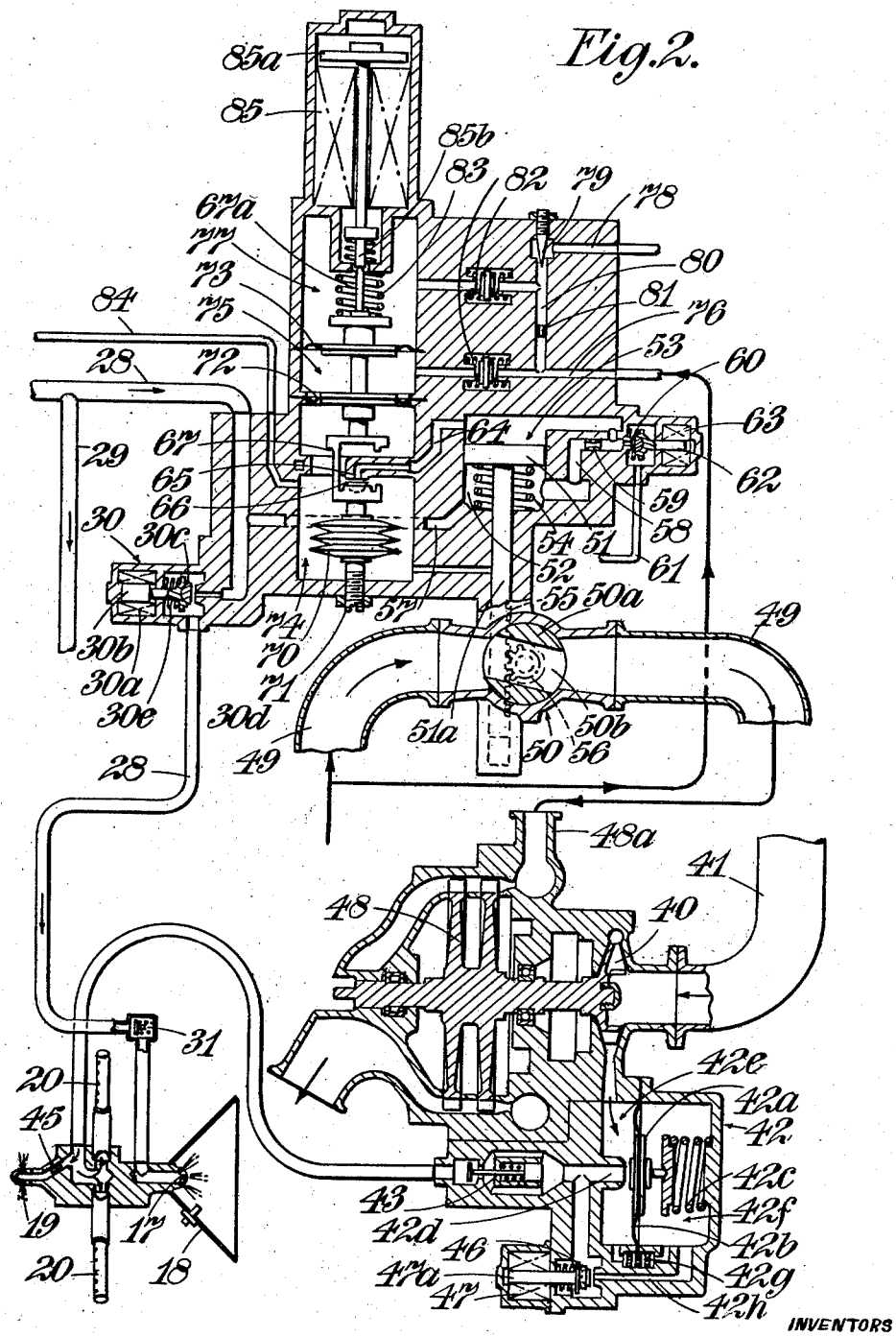
Figure 2 illustrates parts of the fuel system and control means for the fuel in greater detail.

Thus for instance, referring to Figure 2 the shut-off cock 30 is shown as comprising a solenoid 30a having an armature 30b carrying a valve element 30c controlling the outflow through a restricted port 30d leading from the upstream side of the shut-off cock to the downstream side thereof. The armature 30b is spring-loaded by a spring 30e in the sense of closure and the cock is opened by energizing the solenoid 30a.

In an alternative arrangement such as that shown in Figure 3 the shut-off cock 30 comprises as before a solenoid 30a the armature 30b of which carries a valve element 30c. The valve element 30c controls a port 30f between two chambers 32 and 33, whereof the chamber 32 is connected by a duct 34 with pipeline 28 downstream of the shut-off cock 30, and whereof the chamber 33 is separated from the inlet chamber 35 of the shut-off cock 30 by a lift valve element 36 carried by a flexible diaphragm 37, the lift valve element 36 being loaded by a spring 39 to seat on outlet port 30g of the shut-off cock, and by a wall having therein a restricted orifice 38. With this arrangement the shut-off cock is opened when the solenoid is energized lifting the valve element 30c to open the port 30f thereby permitting a flow through the restrictor 38 from the chamber 35 into the chamber 33 and through the port 30f from the chamber 33 into the chamber 32 and thus through duct 34 to the pipeline 28 on the downstream side of the shut-off cock. This flow causes a pressure drop between the inlet chamber 35 and the downstream portion of the pipeline 28 and when the pressure difference reaches a given value the lift valve element 36 is raised from its seat around the port 30g so permitting a flow of fuel to the pilot fuel injector 17. When the solenoid 30a is de-energized and the valve element 30c closes off port 30f the pressures in chambers 33 and 35 become equal so that the spring 39 urges the lift valve element 36 on to the seat around port 30g cutting off the supply of fuel to the pilot fuel injector 17.

The supply of fuel to the second pilot fuel injector 19 and the main fuel injectors 20 of the reheat combustion equipment is effected by a fuel system separate from that supplying fuel to the main fuel combustion equipment 12 of the engine and to the first pilot fuel injector 17 of the reheat combustion equipment. Moreover the supply of fuel to the second pilot fuel injector 19 and the main fuel injectors 20 of the reheat combustion equipment is so controlled that the ratio of the absolute total head pressure at a point in the engine working fluid flow between the compressor delivery and the entry of the turbine 13 to the total head pressure in the working fluid flow in the exhaust assembly, that is downstream of the turbine 13, is maintained substantially constant.

One fuel supply and control arrangement for delivering fuel to the second pilot fuel injector 19 and the main fuel injectors 20 of the reheat combustion equipment is illustrated in Figure 2 and comprises a centrifugal fuel pump 40 drawing in fuel from a pipeline 41 leading to a fuel tank, for instance a fuel tank 21, and delivering fuel past a shut-off cock 42 and a non-return valve 43 to a pipeline 44 leading to the injectors 19, 20 there being a flow restrictor 45 between the pipeline 44 and the pilot fuel injector 19.

The shut-off cock 42 may be of any convenient form and may be operated in any convenient manner and is shown as being electrically controlled and comprising a lift valve element 42a carried by a flexible diaphragm 42b and loaded by a spring 42c to bear against a seat around a delivery port 42d. The diaphragm 42b separates an inlet chamber 42e from a chamber 42f and the chambers are interconnected through a restrictor 42g. The chamber 42f has an outflow passage 42h which is controlled by a valve element 46 carried by the armature 47a of a solenoid 47. When the solenoid is energized the valve element 46 is lifted to allow a bleed from the chamber 42f through the passage 42h so that a difference in pressures occurs between the chambers 42e and 42f. When this difference in pressure reaches a value determined by the rate of the spring 42c the valve 42a is lifted and a delivery flow can occur to the injectors 19, 20.

The centrifugal pump 40 is shown as being driven by a two-stage air turbine 48 and the compressed air for operating the turbine 48 is bled off from the delivery section 11 of the compressor 10 (Figure 1) and conveyed through conduit 49 past a throttle 50 to the inlet connection 48a of the air turbine 48. The air throttle 50 comprises a rotatable plug 50a having a passage 50b running therethrough and the rotatable plug is operated by a servo mechanism arranged to be controlled in accordance with the ratio of the absolute static pressure at the point at which compressed air is tapped off for operating the air turbine 48 to the static pressure at a point just downstream of the engine turbine 13.

The servo mechanism comprises a piston 51 working in a cylinder, divided into two spaces 52, 53, against the action of a spring 54, the piston having its stem 51a formed with a rack 55 engaging a pinion 56 carried by the rotatable plug 50a. The cylinder space 52 is connected by a duct 57 with the branch pipe 28 upstream of the shut-off cock 30 so that the servo fluid employed in the servo mechanism for operating the rotatable plug 50a is pressure fuel from the fuel system supplying fuel to the main combustion equipment 12. The chamber 52 is connected with the chamber 53 by way of a duct 58 having within it a flow restrictor 59, and a bleed port 60 is provided from the duct 58 downstream of the restrictor 59, which port 60 leads to a bleed pipe 61 connected with the suction side of the main fuel pump 22. The outflow through port 60 is controlled by a valve element 62 carried on the armature of a solenoid device 63 which when energised holds the valve element 62 against a seat around the port 60 so preventing flow therethrough. The chamber 53 is connected by way of a duct 64 with a second bleed port 65 the flow through which is controlled by a valve element 66 supported in a carrier 67 the control of which will be described hereinafter. It will be appreciated that when the solenoid 63 is energised and the valve element 62 closes off port 60 the bleed flow from chamber 53 is controlled solely by the valve element 66 and the position of the piston 51 will depend upon the rate of bleed flow through the bleed port 65. It will be clear moreover that for each value of bleed flow through the port 65 the piston 51 will take up a corresponding position in which the difference in the loads on the piston 51 due to the pressure in chambers 52 and 53 is balanced by the load on spring 54.

The carrier 67 is connected at one end to an evacuated capsule 70 having an adjustable abutment 71, and is connected at its opposite end to two flexible diaphragms 72, 73, whereof the diaphragm 72 is arranged to be of a lesser effective area than the diaphragm 73. The diaphragm 72 separates a chamber 74 receiving the bleed flow from port 65 from a chamber 75 which is connected by conduit 76 with the compressed air tapping conduit 49 upstream of the air throttle 50. The effective area of the evacuated capsule 70 is adjusted to be equal to the effective area of diaphragm 72 in order to balance the load acting on the diaphragm 72 due to the pressure in chamber 74 which is connected by a conduit 84 to the suction side of pump 22. The effective area of the capsule 70 is varied by adjusting the abutment 71 of the capsule.

The diaphragm 73 separates the chamber 75 from a chamber 77 which is connected by a conduit 78 with a pressure tapping point in the exhaust assembly 15 (Figure 1) just downstream of the turbine 13. The conduit 78 has located in it an adjustable flow restrictor 79 and is connected with the conduit 76 by an interconnecting conduit 80 containing a flow restrictor 81.

The flow restrictors 79 and 81 in the conduits 78 and 80, one or both of which restrictors are of variable area are provided for the purpose of adjusting the ratio to which the device is sensitive. This avoids the necessity of using diaphragms of different areas to compensate for small differences in the desired ratio to suit the individual characteristics of similar engines which are not identical, and allows for manufacturing tolerances in the control unit. The pressure in space 77 will be proportional to, and slightly greater than that in tapping 78, and to this end the area of restrictor 79 will be much greater than the area of fixed restrictor 81.

The conduits 76 and 78 each have provided in them no-flow valves 82 which become operative only when there is an excessive flow through the conduits and operate to cut down such a flow.

The operation of the control is as follows. Assume that the effective areas of the diaphragms 72 and 73 are given by $A_2$ and $A_1$ respectively and that the difference in their effective areas is $A_3$, then the pressure tending to lift the carrier 67 and thus close the valve element 66 on to the port 65 will be given by the expression $P_2(A_1 - A_2)$ or $P_2.A_3$, where $P_2$ is the static pressure at the point at which the air tapping conduit 49 is connected to the delivery section 11 of the compressor 10. This load is opposed by the load on the diaphragm 73 due to the pressure ($P_4$) in chamber 77 and the opposing load is therefore given by the expression $P_4.A_1$.

Now if the load $P_2A_3$ is greater than the load $P_4A_1$, then $P_2/P_4$ is greater than $A_1/A_3$ which is a preselected value, say K, and the carrier 67 will be lifted to close off the port 65 reducing the outflow from chamber 53 and thus increasing the pressure therein so that the piston 51 will move downwardly rotating the plug valve 50a and allowing an increase in the supply of compressed air to the turbine 48 so increasing the rate of rotation of the turbine 48 and the fuel delivery from the centrifugal pump 40 to the injectors 19, 20. The increased supply of fuel will cause a corresponding increase in the value of the pressure $P_4$ and the increase in the fuel supply and thus of the pressure $P_4$ will continue until $P_2/P_4$ becomes equal to K.

Conversely, if $P_2A_3$ is less than $P_4A_1$, then $P_2/P_4$ is less than $A_1/A_3$ i. e. is less than K. Under these conditions the carrier 67 will be lowered and the outflow through port 65 increased thus decreasing the pressure within chamber 53 and allowing the piston 51 to rise, cutting down the air supply to turbine 48 and slowing down the turbine and reducing the fuel supply from pump 40 to the injectors 19, 20. The reduction in the fuel supply will cause a decrease in the value of the pressure $P_4$ and the decrease in the value of the pressure $P_4$ will continue until $P_2/P_4$ becomes equal to K.

It will thus be seen that the control will operate to maintain the ratio of the pressure $P_2$ to the pressure $P_4$ equal to the value of K which is predetermined in accordance with the effective area of the diaphragms 72, 73.

The capsule 70 is arranged to have an effective area which is equal to the area of the diaphragm 72 and the resilient load due to the capsule 70 is balanced by a spring 83.

Referring now to Figure 3, there is illustrated a modified form for part of the control described with reference to Figure 2.

In the arrangement illustrated in Figure 3 the air throttle 50 is controlled as before by a piston 51 the cylinder spaces 52 and 53 on each side of which are connected through a passage incorporating the restricted orifice 59. In this construction, however, instead of the shutting-off of the turbine air supply being controlled by a solenoid 63 which in turn controls a valve element 62 to open or close the bleed port 60 from the passage between the cylinder spaces 52 and 53, the solenoid 63 controls a valve element 162 which controls the flow through a port 160 connecting the passage 158 leading from the cylinder space 52 to chamber 159 the outflow from which into chamber 53 is through the flow restrictor 59. When the solenoid 63 is energised the valve element 162 is lifted off from a seat around the port 160 so permitting a flow into the chamber 53. When the solenoid is de-energised the valve element 162 is held on the seat around port 160 by a spring 161 so that no flow can take place to the chamber 53 and the piston moves upwardly as viewed in the drawings and closes the air throttle 50.

In operation of the reheat combustion equipment, the outflow from the chamber 53 is again controlled by a valve element 66 but in this construction the valve element 66 is carried by a lever 167 pivotally supported on a flexible diaphragm 168 and the lever 167 is arranged to be loaded by the diaphragms 72 and 73 through a rod 169 interconnecting them, is arranged to be engaged by the evacuated capsule 70 through a tappet 170, and is arranged to be loaded by the spring 83 through a tappet element 171.

The operation of the device is exactly similar to that described in relation to Figure 2 except that instead of having a valve carriage 67 which is raised and lowered on variation of the values of $P_4$ and $P_2$, there is a lever which is rocked.

A light spring 183 is provided to hold the end of the rod 169 in contact with the lever 167.

The diaphragm 168 is perforated so that the spaces on both sides of the diaphragm form parts of the chamber 74, The sequence of events on initiating reheat fuel supply is briefly as follows:

On starting up of the reheat equipment solenoid 30a is energized to open the shut-off cock 30 allowing fuel from the main fuel system to be supplied to the pilot fuel injector 17. Solenoid 47 is also energized to allow fuel from the separate fuel supply system to be delivered to the injectors 19, 20. This flow of fuel is controlled by the servo mechanism containing the solenoid 63 which is energized to close port 60 so that the servo piston is controlled in accordance with $P_2$ and $P_4$ as above described. If the temperature of the turbine tends to exceed a predetermined value then the solenoid 85 is energized and over-rides the $P_2/P_4$ control to cut down the flow of fuel to the injectors 19, 20. The solenoids 30a, 47 and 63 are energized simultaneously on starting of the reheat equipment and are de-energized simultaneously on shutting down of the equipment.

In certain cases, it may be desirable to provide a temperature control system to over-ride the functioning of the pressure ratio control just described. For example, as described in the specification of copending United States application Serial No. 72,459 filed January 24, 1949, a temperature-sensitive element may be located on the downstream side of the turbine system and on the upstream side of the reheat combustion stage, and arranged to form part of a bridge circuit, the output from which bridge circuit is fed to an amplifier. The amplifier output may be fed to a solenoid arranged to apply a load in the pressure-sensitive device in the sense appropriate to open the valve 66 controlling the outflow from chamber 53 when a preselected maximum value of a temperature at the location of the temperature-sensitive device tends to be exceeded. This arrangement is particularly suitable when it is desired to use the temperature control for the purpose of avoiding the possibility of a maximum preselected temperature being exceeded in the turbine.

Such a control is indicated in Figures 2 and 3. Thus for instance in Figure 2 there is shown a solenoid 85 arranged coaxially with the carrier 67 and the armature 85a of the solenoid is arranged on energisation of the solenoid 85 to be drawn downwardly and by a tappet portion 85b on its lower end to bear against an extension 67a of the carrier 67 and move it downwardly and to move the valve element 66 away from the port 65. Referring to Figure 3 the same control is indicated as comprising a solenoid 185 the armature 185a of which is lifted on energisation of the solenoid 185; the lower end of the armature 185 on being raised engages lugs 167a on the pivoted lever 167 and rocks the pivoted lever to lift the valve element 66 clear of the port 65.

The temperature-sensitive control may if desired be arranged to operate as a "trimming" device on the basic control provided by the pressure-sensitive control, so that in effect the pressure-sensitive control of diaphragms 72, 73 provides an approximate control of the fuel supply to fuel injectors 19, 20 of the reheat combustion stage, and that the temperature-sensitive device operates in the sense of increasing or decreasing the basic supply in order to maintain a preselected temperature in the turbine system. This arrangement provides a greater degree of stability of control.

Figure 4 corresponds to the central portion of Figure 1 and the same reference numerals are used in Figure 4 as are employed on Figure 1. In addition to the elements shown in Figure 1 there is illustrated in Figure 4 a thermocouple or other temperature-sensitive device 90 from which a pair of leads 91 extend to a discriminator 92, the discriminator being connected to an amplifier 93 which amplifies the signal from the discriminator and feeds it to the control 85.

It will be noted that, although it is desired to maintain constant the ratio of the total head pressure at a point between the compressor delivery and the turbine to the pressure just downstream of the turbine, in the arrangement above described the pressure tappings leading to conduits 76, 78 are said to be static pressure tappings in the compressor delivery and in the exhaust duct; these tappings are employed since they are more convenient to effect and, since it has been found that by controlling the ratio of these static pressures, a satisfactory control of the ratio of the total head pressures is obtained. It will be understood, however, that total head pressure tappings may be employed.

We claim:

1. A fuel system for a gas-turbine engine having a compressor, main combustion equipment, a gas turbine, reheat combustion equipment, and a propelling nozzle connected in a flow series, which fuel system comprises a fuel pump arranged to deliver fuel to the reheat combustion equipment, an air turbine connected to drive said fuel pump, a source of compressed air, an air-supply-controlling throttle connected to control the supply of compressed air from said source to said air-turbine thereby to control the rotational speed of the air turbine, and a pressure-sensitive device connected to a point in the engine between the compressor delivery and the gas turbine inlet and to a point in the engine between the gas turbine and the propelling nozzle to be sensitive to a preselected value of the ratio of the pressures at said points, and connected to operate said throttle, whereby the throttle is adjusted normally to maintain at least substantially said preselected value of the ratio.

2. A fuel system for a gas-turbine engine having a compressor, main combustion equipment, a gas turbine, reheat combustion equipment, and a propelling nozzle connected in flow series, which fuel system comprises a fuel pump arranged to deliver fuel to the reheat combustion equipment, an air turbine connected to drive said fuel pump, a source of compressed air, an air-supply-controlling throttle connected to control the supply of compressed air from said source to said air turbine thereby to control the rotational speed of the air turbine, a pressure-fluid-operated servo-mechanism connected to said throttle to actuate it, and a pressure-sensitive device connected to a point in the engine between the compressor delivery and the gas turbine inlet and to a point in the engine between the gas turbine and the propelling nozzle to be sensitive to a preselected value of the ratio of the pressures at said points and connected to actuate said servo-mechanism, whereby the throttle is adjusted normally to maintain at least substantially said preselected value of the ratio.

3. A fuel system as claimed in claim 2, wherein the servo-mechanism comprises a piston movable in a cylinder having a restricted fluid communication between its ends, having a pressure servo-fluid supply connected to one end and having an outflow valve connected to control a flow of servo-fluid from the other end of the cylinder which outflow valve is actuated by the pressure-sensitive device thereby to control the pressure drop across the piston.

4. A fuel system as claimed in claim 2, wherein said pressure-sensitive device comprises a pair of flexible diaphragms one of which is arranged to be subjected to said pressure at the point in the engine between the compressor delivery and the turbine inlet and the other of which diaphragms is arranged to be subjected at least to said pressure at the point between the turbine and the propelling nozzle, said first diaphragm being given an effective area which is less than and in a preselected relation to the effective area of said second diaphragm and said servo-mechanism having an element loaded by the diaphragms to be actuated by the difference of loads transmitted thereto by the diaphragms to control the adjustment of said air-supply controlling throttle.

5. A fuel system as claimed in claim 4, wherein said diaphragms are interconnected for operation by a rigid member and said second diaphragm is arranged to be loaded in opposite senses by the pressure at the point between the compressor delivery and turbine inlet and at the point between the turbine and the propelling nozzle respectively.

6. A fuel system as claimed in claim 5, wherein the servo-mechanism comprises a piston movable in a cylinder having a restricted fluid communication between its ends, having a pressure servo-fluid supply connected to one end and having an outflow valve connected to control a flow of servo-fluid from the other end of the cylinder, which outflow valve comprises a port, and wherein said element of the servo-mechanism is a valve element controlling the flow through said port, which valve element is carried on a movable member actuated by said diaphragms, said movable member being also loaded by an evacuated capsule having an effective area equal to the effective area of said first diaphragm and by a spring arranged to balance the resilient load of said evacuated capsule.

7. A fuel system as claimed in claim 6, wherein said movable member is a part carried by and movable with said diaphragms.

8. A fuel system as claimed in claim 6, wherein said movable member is a rocking lever.

9. A fuel system as claimed in claim 2, comprising also temperature-sensitive control means including a temperature-sensitive element located in the gas stream on the upstream side of the reheat combustion equipment and adapted to give a signal dependent on the temperature sensed thereby, amplifier means connected to said temperature-sensitive element and adapted to amplify the signal, and means connected to respond to the amplified signal and to over-ride the pressure-sensitive device in response to the amplified signal to vary the fuel supply to the reheat combustion stage in accordance with the temperature sensed by said temperature-sensitive element.

10. A fuel system as claimed in claim 9, wherein said temperature-sensitive control means is operative only to reduce the fuel supply to the reheat combustion stage, thereby to prevent a preselected temperature from being exceeded in the turbine.

11. A fuel system as claimed in claim 9, wherein said temperature-sensitive control means operates in the sense of increasing and decreasing the fuel supply to the reheat combustion stage, thereby to effect a trimming adjustment of said air-supply controlling throttle to maintain a selected temperature at the location of the temperature-sensitive element.

12. A fuel system as claimed in claim 2, wherein said pressure-sensitive device comprises a pair of flexible diaphragms one of which is arranged to be subjected to said pressure at the point in the engine between the compressor delivery and the turbine inlet and the other of which diaphragms is arranged to be subjected at least to said pressure at the point between the turbine and the propelling nozzle, said first diaphragm being given an effective area which less than and in a preselected relation to the effective area of said second diaphragm and said servo-mechanism having a valve element loaded by the diaphragms to be actuated by the difference of loads transmitted thereto by the diaphragms to control the adjustment of said air-supply controlling throttle, and wherein said servo-mechanism comprises a piston movable in a cylinder having restricted fluid communication between its ends, having a pressure servo-fluid supply connected to one end and having an outflow valve connected to control a flow of servo-fluid from the other end of the cylinder which outflow valve comprises a port, said valve element controlling the flow through said port, and said valve element being carried on a movable member actuated by said diaphragms, said movable member being also loaded by an evacuated capsule having an effective area equal to the effective area of said first diaphragm and by a spring arranged to balance the resilient load of said evacuated capsule.

13. A fuel system as claimed in claim 12, wherein said movable member is a part carried by and movable with said diaphragms.

14. A fuel system as claimed in claim 12, wherein said movable member is a rocking lever.

15. A fuel system for a gas-turbine engine having a compressor, main combustion equipment, a turbine, reheat combustion equipment, and a propelling nozzle connected in flow series, which fuel system comprises a fuel pump arranged to deliver fuel to the reheat combustion equipment, an air turbine connected to drive said fuel pump, a source of compressed air, an air-supply-controlling throttle connected to control the supply of compressed air from said source to said air-turbine thereby to control the rotational speed of the turbine, a pressure-sensitive device comprising a pair of flexible diaphragms one of which is arranged to be subjected to the pressure at a point in the engine between the compressor delivery and the turbine inlet and the other of which diaphragms is arranged to be subjected at least to the pressure at a point between the turbine and the propelling nozzle, said first diaphragm being given an effective area which is less than and in a preselected relation to the effective area of said second diaphragm and an element loaded by the diaphragms to be actuated by the difference of loads transmitted thereto by the diaphragms to control the adjustment of said air-supply controlling throttle, whereby the throttle is adjusted so as normally to maintain at least substantially the preselected value of the ratio of the pressures at the two points in the engine.

16. A fuel system for a gas-turbine engine having a compressor, main combustion equipment, a turbine, reheat combustion equipment, and a propelling nozzle connected in flow series, which fuel system comprises a fuel pump arranged to deliver fuel to the reheat combustion equipment, an air turbine connected to drive said fuel pump, a source of compressed air, an air-supply-controlling throttle connected to control the supply of compressed air from said source to said air-turbine thereby to control the rotational speed of the turbine, a pressure-sensitive device connected to a point in the engine between the compressor delivery and the turbine inlet and to a point in the engine between the turbine and the propelling nozzle to be sensitive to a preselected value of the ratio of the pressures at said points, and connected to operate said throttle, whereby the throttle is adjusted so as normally to maintain at least substantially said preselected value of the ratio, and temperature-sensitive control means including a temperature-sensitive element located in the gas stream on the upstream side of the reheat combustion equipment, and means operable on sensing by the temperature-sensitive element of a temperature in excess of a predetermined value to over-ride said pressure-sensitive device and to reduce the fuel supply to the reheat combustion stage.

17. A fuel system as claimed in claim 16, wherein said temperature-sensitive control means is operative only on sensing by said temperature-sensitive element of a temperature in excess of the predetermined value thereby to prevent a preselected maximum temperature from being exceeded in the turbine.

18. A fuel system as claimed in claim 16, wherein said temperature-sensitive control means is operative to effect a trimming adjustment of said air-supply-controlling throttle not only to decrease the fuel flow but also to increase the fuel flow, thereby to maintain a preselected temperature condition in the turbine.

(References on following page)

References Cited in the file of this patent

UNITED STATES PATENTS

| | | |
|---|---|---|
| 2,540,594 | Price | Feb. 6, 1951 |
| 2,551,229 | Alford et al. | May 1, 1951 |
| 2,560,118 | Malone et al. | July 10, 1951 |
| 2,566,961 | Poole | Sept. 4, 1951 |
| 2,570,591 | Price | Oct. 9, 1951 |
| 2,580,962 | Sédille | Jan. 1, 1952 |
| 2,612,020 | Griffith | Sept. 30, 1952 |

FOREIGN PATENTS

| | | |
|---|---|---|
| 587,558 | Great Britain | May 7, 1947 |